G. H. RABENALT.
BATTERY PLATE.
APPLICATION FILED MAR. 26, 1912.
1,068,929.
Patented July 29, 1913.
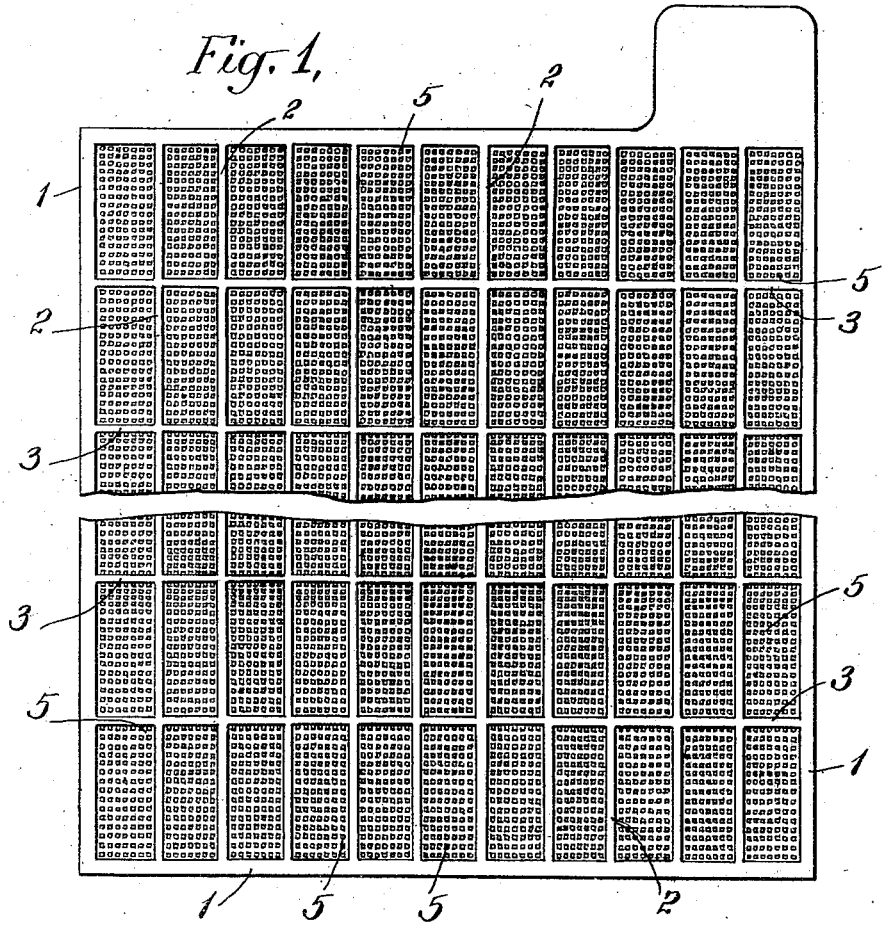
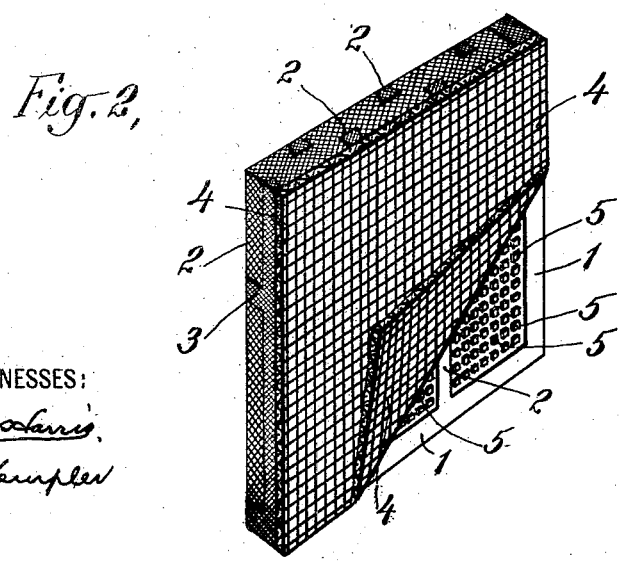
WITNESSES:
INVENTOR
Gustav H. Rabenalt
BY
Kenyon & Kenyon
ATTORNEYS

UNITED STATES PATENT OFFICE.

GUSTAV H. RABENALT, OF BUFFALO, NEW YORK, ASSIGNOR TO GOULD STORAGE BATTERY COMPANY, A CORPORATION OF NEW YORK.

BATTERY-PLATE.

1,068,929.  Specification of Letters Patent.  Patented July 29, 1913.

Application filed March 26, 1912. Serial No. 686,313.

*To all whom it may concern:*

Be it known that I, GUSTAV H. RABENALT, a citizen of the United States, and a resident of Buffalo, county of Erie, and State of New York, have invented certain new and useful Improvements in Battery-Plates, of which the following is a specification.

My invention relates to an improved method of increasing the capacity of pasted battery plates and more particularly those such as used in lead storage batteries.

The objects and motive of the invention will more clearly appear from the detailed description taken in connection with the accompanying drawing which forms a part of this specification.

In the drawing Figure 1 is a side view of a battery plate illustrating my improvements in one form; and Fig. 2 is an enlarged perspective of a section of such a storage battery plate being treated in accordance with one form of my invention.

It is well known that in lead storage battery plates in which dense paste is used as active material, the initial capacity of the plates is quite low, but that after being charged and discharged a number of times, the capacity of the plates is increased to normal, or until it has reached a capacity substantially equal to that of plates made with active material of soft or porous paste. This low initial capacity of the dense paste plate necessitates a very considerable loss in energy or efficiency before the capacity of the plate is brought up to normal, while the plate has the advantage of the soft or porous paste plate of longer life and strength.

One object of the present invention is to increase the initial capacity of the dense paste plate in a more advantageous and beneficial manner thereby obtaining the full initial capacity of the porous plate and at the same time retaining the long life and strength of the dense paste plate.

It will be understood that the capacity of a pasted plate is a function of the exposed area of active material. It is, therefore, possible to increase the capacity of a dense paste plate by increasing the exposed area of its active material.

As shown in Figs. 1 and 2 the plate is provided with an antimony-lead grid 1 having upright ribs 2 and transverse ribs 3 forming a lattice work which is filled with a dense paste of well-known composition. The dense paste is mixed up with a liquid in a well-known manner and applied to the grid when in a soft condition, and after it has been pressed into the grid and while still soft, I apply to its surface a sheet of cloth 4, such as scrim. On this a sheet of paper or other smooth material may be placed and then a smooth roller applied thereto so that the scrim is forced into the surface of the paste, the threads of the scrim forming a large number of vertical and horizontal grooves, leaving the surface covered with a large number of small projections 5 whereby the surface of the active material is roughened and its area very considerably increased. The grooves may also be formed by pressing the scrim into the paste by a flat block of wood, metal or other material, or by using instead of the scrim, a metallic fabric or screen, such as wire-netting, made of any suitable metal especially one which is not readily attacked by the ingredients of the paste. This method is more advantageous than the using of a rigid die not only because of cheapness and simplicity but because the paste is apt to adhere to such a rigid metal die and possibly ruin the plate.

When producing the roughness or grooves with a fabric such as scrim, the fabric is left in the surface of the paste until the paste is sufficiently hardened or set when the fabric is pulled off as shown in Fig. 2, and the grooves or roughness will remain.

A dense paste plate treated in the above manner will have a much larger initial capacity than would otherwise be the case, and in fact it may be as much as the initial capacity of a soft or porous paste plate. After a number of reversals of charging and discharging, the grooves or depressions become more or less filled, due to the electro-chemical action on the paste near the surface. But this does not materially decrease the capacity, if at all, because at this stage the dense paste plate would have any way reached the desired capacity due to the reversals. Furthermore, the grooves or rough depressions allow a more ready and quick electro-chemical action to increase the capacity of the plate by providing space for the expansion of the particles of the paste at the surface.

The production of a large number of small grooves or irregular depressions in the manner described is much preferred, since this does not bring about certain mechanical disadvantages which may be present with the large grooves or depressions.

Although I have described my improvements in great detail, nevertheless I do not desire to be limited to such details except as clearly pointed out in the appended claims, since many changes and modifications may well be made by those skilled in the art without departing from the spirit and scope of my invention in its broader aspects.

Having fully and clearly described my improvements what I claim as new, and desire to secure by Letters Patent, is:—

The process of increasing the capacity of pasted storage battery plates which consists in forcing a fabric die into the paste while soft, and removing the die after the paste has sufficiently set to cause the grooves to remain.

In testimony whereof, I have signed my name to this specification, in the presence of two subscribing witnesses.

GUSTAV H. RABENALT.

Witnesses:
 HENRY L. FREY,
 GRANT L. TALLEY.

---

Copies of this patent may be obtained for five cents each, by addressing the "Commissioner of Patents, Washington, D. C."